United States Patent
Dickinson et al.

(10) Patent No.: US 6,182,054 B1
(45) Date of Patent: Jan. 30, 2001

(54) DYNAMICALLY CONFIGURABLE AND EXTENSIBLE RATING ENGINE

(75) Inventors: Frank Dickinson, Boca Raton; Gireesh K. Sadasivan, Coral Springs, both of FL (US)

(73) Assignee: Daleen Technologies, Inc., Boca Raton, FL (US)

( * ) Notice: Under 35 U.S.C. 154(b), the term of this patent shall be extended for 0 days.

(21) Appl. No.: 09/149,495

(22) Filed: Sep. 4, 1998

(51) Int. Cl.[7] ........................................... G06F 17/60
(52) U.S. Cl. ................................. 705/34; 705/20
(58) Field of Search ................... 705/34, 20, 40, 705/35

(56) References Cited

U.S. PATENT DOCUMENTS

| | | | |
|---|---|---|---|
| 5,285,494 | * 2/1994 | Sprecher et al. | 379/59 |
| 5,515,425 | * 5/1996 | Penzias et al. | 379/114 |
| 5,696,906 | * 12/1997 | Peters et al. | 395/234 |
| 5,761,560 | * 6/1998 | Minsil et al. | 705/34 |
| 5,878,400 | * 3/1999 | Carter, III | 705/20 |
| 5,943,657 | * 8/1999 | Freestone et al. | 705/400 |

OTHER PUBLICATIONS

Vince Vittore, "Billing one bit at a time", Telephony, Jun. 8, 1998, p. 184.*

Shoshana Loeb, "Interactive Billing for Broadband and Multimedia Services", Proceedings of the Second International Workshop on Community Networking, 1995, p. 221–223.*

Dan O'Shea, "Billing Platforms Soar to New Heights", Telephony, May 13, 1996, p. 24–27.*

Dan O'Shea, "Bizarre Billing Bazaar", Telephony, Jun. 23, 1996, p. 28–30.*

Rozane Richter, "Vendor Profiles", Public Utilities Fortnightly, Fall–Winter Supplement 1998, p. 24–33.*

D. Douglas Grapham, "Shopping for Revenue Management", Wireless Review, Feb. 15, 1998.*

"Convergence, Unified Customer Care, and Bill Aggregation" Kenan Systems White Paper 1998.*

"IP Telephony Grows Up" Kenan Systems White Paper 1998.*

"Kenan Sahin: Phone bill billionaire geta a hearing at last" Financial Times Oct. 1999.*

Kenan Systems Web Page (www.kenan.com/content/solutions/billing/index.htm) Oct. 1999.*

"Kenan Systems and Jones cyber solutions offer Saturn a customer management solution", M2 Presswire Dec. 1997.*

J. Wilson, "Configuring An Optimized Convergence Network Billing System", 1998 IEEE Network Operations and Management Symposium, p. 130–147 Feb. 1998.*

"Unix–Based Billing and Customer Care System Gets High Marks", Unix Update, p. 1 Jun. 1997.*

"Kenan Systems: Industry's First Strategic Billing Software with Customer Analysis Capability", M2 Presswire Apr. 1996.*

"Kenan Systems'Internet and Electronic Commerce Billign and Customer Care System Delivers Major New Capabilities", PR Presswire Sep. 1997.*

* cited by examiner

Primary Examiner—Eric W. Stamber
Assistant Examiner—Steven F Vincent
(74) Attorney, Agent, or Firm—Fleit, Kain, Gibbons, Gutman & Bongini P.L.; Jon A. Gibbons

(57) ABSTRACT

A method and apparatus to create billing records in a rating engine. The method comprising the steps of assembling one or more sets of subscriber information; assembling a rating plan; associating a rating procedure with a rating engine; calculating billing records with the rating engine through the rating procedure using the rating plan and the subscriber information.

The method and apparatus are applicable to any service where a subscriber is billed by the usage of a service or where the subscriber is billed a periodic basis for the service.

21 Claims, 10 Drawing Sheets

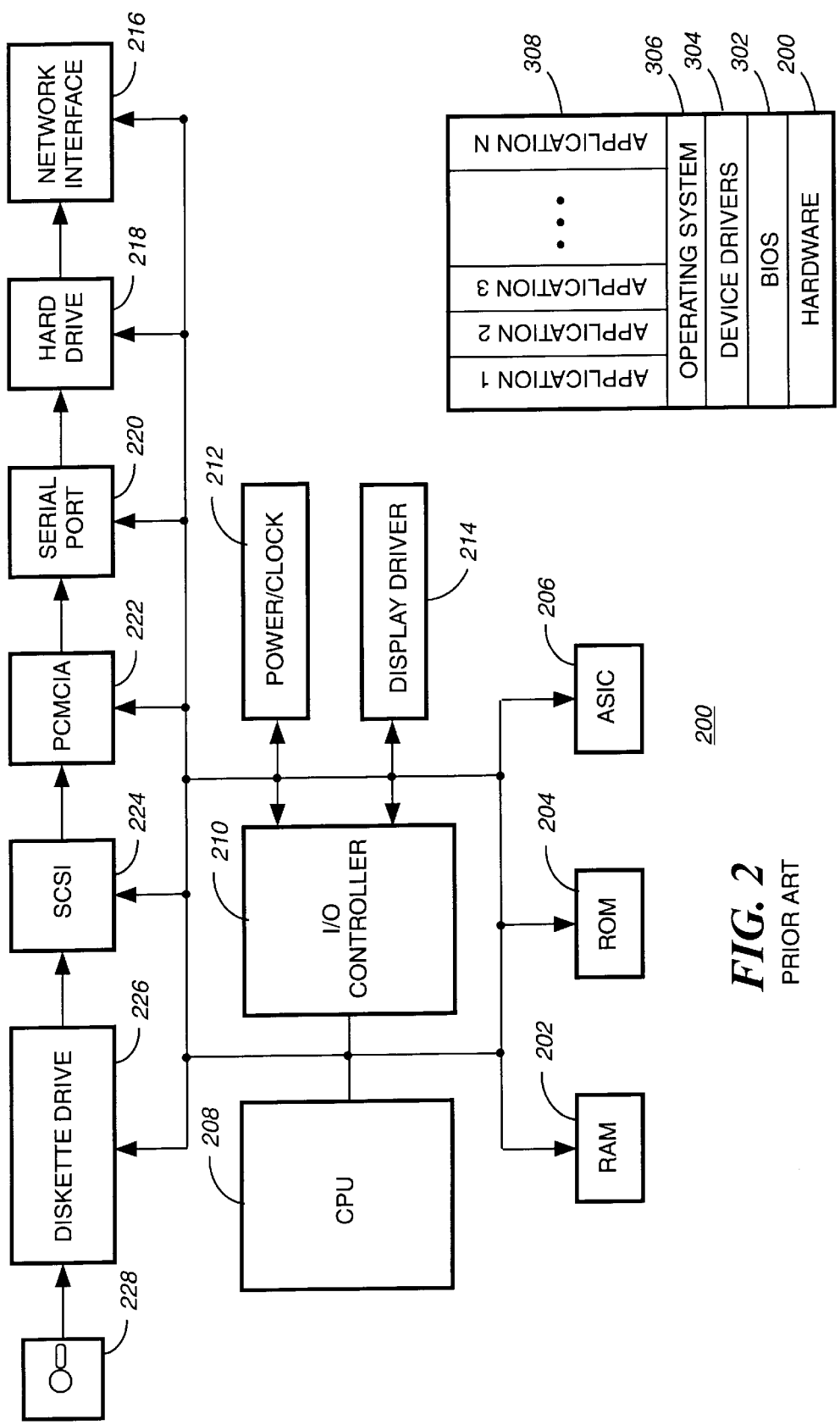

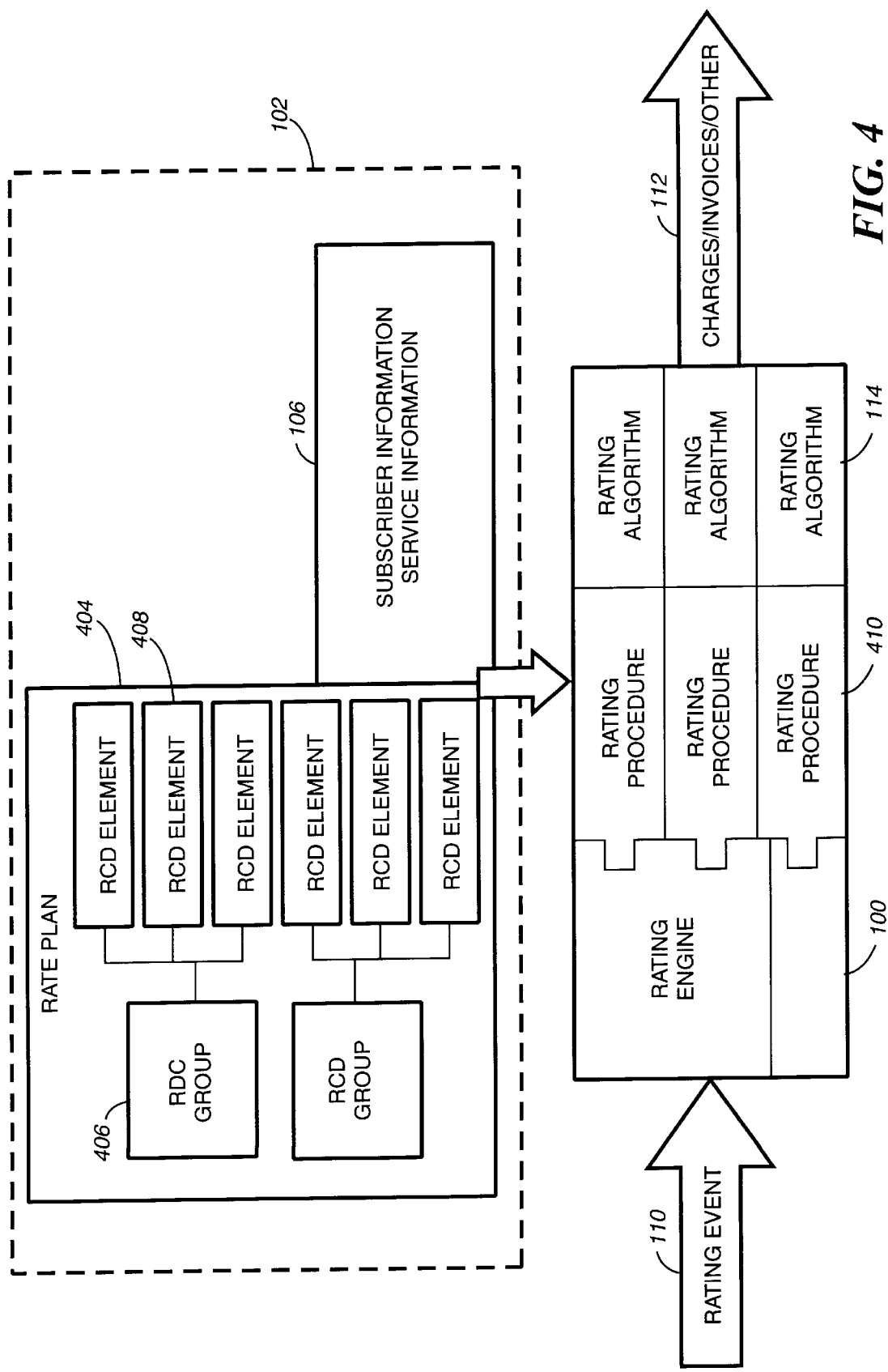

TEMPLATES 600

| RCD GROUP TYPE | |
|---|---|
| RCD GROUP TYPE | INTEGER |
| GROUP TYPE NAME | VARCHAR(50) |
| PERIOD CLASS | CHAR(1) |
| CREATE USER | VARCHAR(30) |
| CREATE DATE TIME | DATETIME YEAR TO SECOND |
| MODIFY USER | VARCHAR(30) |
| MODIFY DATE TIME | DATETIME YEAR TO SECOND |

603 ⤴
606 ⤴

| RATING CONTROL ELEMENT TYPE | |
|---|---|
| RCD GROUP TYPE | INTEGER |
| RCD ELEMENT TYPE | INTEGER |
| REQUIRED | CHAR(1) |
| ORDER NUMBER | INTEGER |
| CREATE USER | VARCHAR(30) |
| CREATE DATE TIME | DATETIME YEAR TO SECOND |
| MODIFY USER | VARCHAR(30) |
| MODIFY DATE TIME | DATETIME YEAR TO SECOND |

605 ⤴
607 ⤴
608 ⤴

DATA 612

| RCD GROUP | |
|---|---|
| RCD GROUP ID | INTEGER |
| RATE PLAN ID | INTEGER |
| RCD GROUP TYPE | INTEGER |
| TRANSACTION TYPE | INTEGER |
| PERIOD TYPE | INTEGER |
| START DATE TIME | DATETIME YEAR TO SECOND |
| END DATE TIME | DATETIME YEAR TO SECOND |
| RATE TAG | CHAR (16) |
| CREAT USER | VARCHAR (30) |
| CREATE DATE TIME | DATETIME YEAR TO SECOND |
| MODIFY USER | VARCHAR (30) |
| MODIFY DATE TIME | DATETIME YEAR TO SECOND |

TEMPLATES — 600

| RCD ELEMENT TYPE | |
|---|---|
| RCD ELEMENT TYPE — 607 | INTEGER |
| DATE TYPE — 702 | INTEGER |
| ELEMENT TYPE NAME — 708 | VARCHAR(50) |
| REGULAR EXPRESSION — 704 | VARCHAR(255) |
| DEFAULT VALUE — 706 | VARCHAR (32) |
| DISPLAY LABEL | VARCHAR(50) |
| CREATE USER — 610 | VARCHAR(30) |
| CREATE DATE TIME | DATETIME YEAR TO SECOND |
| MODIFY USER | VARCHAR (30) |
| MODIFY DATE TIME | DATETIME YEAR TO SECOND |

DATA — 612

| RCD ELEMENT — 618 | |
|---|---|
| RCD ELEMENT ID | INTEGER |
| RCD GROUP ID | INTEGER |
| RCD ELEMENT TYPE | INTEGER |
| VALUE | VARCHAR (255) |
| CREATE USER | VARCHAR (30) |
| CREATE DATE TIME | DATETIME YEAR TO SECOND |
| MODIFY USER | VARCHAR (30) |
| MODIFY DATE TIME | DATETIME YEAR TO SECOND |

DYNAMICALLY CONFIGURABLE AND EXTENSIBLE RATING ENGINE

CROSS-REFERENCE TO RELATED APPLICATIONS

Not applicable

BACKGROUND OF THE INVENTION

Many different communications services continue to converge. These communications services include voice, paging, voice mail, E-mail, caller-ID and more. Communication technologies include wire-line voice and data, wireless voice and data, alphanumeric pagers, Internet/Intranet, Specialized Mobil Radio (SMR), electronic commerce (E-Commerce), satellite and cable. The providers of communications services using these technologies are striving to provide a complete service offering, from hardware and physical communications equipment, through customer billing and customer service. The pace of rapid technological advancement requires that these providers can quickly provide new services and technologies as they become available. The pressure to constantly innovate is intense. Unfortunately, most of the billing systems currently used by the providers of integrated communications technology are based on custom, monolithic, proprietary systems used for a specific service. Therefore, a need exists to provide a Billing System with the flexibility to quickly adapt to new services and customer billing requirements.

One method the providers of billing systems use to provide flexibility to accommodate future billing requirements is the use of interchangeable Rating Engines. Turning now to FIG. 1, shown is a block diagram of a prior art Rating Engine. The Rating Engine 100 is a software module running on a commercially available hardware platform such as a server. The term "Rating" is used to refer to the process by which charges are assigned to a subscriber based on the particular usage of a service. A Rating Algorithm 114 is coded directly into a Rating Engine. The Rating Engine 100 is driven by Rating Control Data 102 in response to a Rating Event 110. The term "Rating Event" is more fully described in the paragraph below. Rating Control Data 102 comprises two major components: Information (Subscriber & Service) 106 and Predefined Rate Plans 104. The Rating Control Data 102 is used to drive the computation that the Rating Engine 100 performs in order to create bills, invoices or customer charges 112. For example, the Rate Plan can be a wireless telephone monthly subscriber plan with different air time discounts provided based on the number of minutes of monthly usage.

As stated above, the Rating Algorithm is coded (or programmed) directly into the Rating Engine 100. If a change or update is required to the Rating Engine 100 to modify the Rating Algorithm 114 or to modify the Rating Control Data 102, the Service Provider needs to re-program, re-compile, re-link and re-test the entire Rating Engine 100. The requirement to re-program, re-compile, re-link and re-test a Rating Engine 100 adapted to a new communication service environment can be expensive and time consuming. These changes introduce new defects and bugs into the Rating Engine 100. The defects and bugs are not restricted to the functionality that has changed, but rather the entire Rating Engine 100 is susceptible to new bugs since the entire Rating Engine 100 needs to be re-complied and re-linked. Accordingly, a need exists to provide a method and system to enable the incorporation of new Rating Algorithms 114 without the need to change the basic functionality and structure of the Rating Engine 100.

The Rating Engine 100 of FIG. 1 performs a Rating Process to create customer charges, customer bills, customer invoices and other customer output 112. A Rating Engine 100 is usually triggered to begin a Rating Process using Rating Control Data (Subscriber & Service & Predefined Rate Plans) 102 and applying Rating Algorithm 114 in response to some Rating Event 110. This Rating Event 110 can be a normal monthly billing cycle for a customer, the need for a customer service representative to review an account, incoming usage from a telephone switch, or any other billing needs or any other Billing System event in response to an operator demand. Alternately, the Rating Event 110 can be scheduled at predetermined regular time intervals.

It is common that in a multi-service environment as new service features are added, new sets of Rating Control Data 102 and Rating Algorithms 114 are required. For example, the service offering text paging may offer billing that is dependent on the number of alphanumeric text characters transmitted per billing period. This billing scheme for text paging is different from the billing scheme for other traditional communication services where the charges are based on the amount of time per billing period the service was used. As new services are offered, the provision of new sets of Rating Control Data 102 and Rating Algorithms 114 to the Rating Engine 100 is required. The providers of billing systems do not accommodate the change in Rating Control Data 102 and Rating Algorithms 114 as services change without the need to re-program, re-compile and re-test the software for the Rating Engine 100. As previously discussed, this can be expensive and time-consuming. Moreover, providers of communication services many times do not know or have specification for new Rating Plans before the Billing System must be implemented. Therefore, a need exists to provide new sets of Rating Control Data 102 and Rating Algorithms 114 to a Rating Engine 100 to overcome these problems.

SUMMARY OF THE INVENTION

Briefly, in accordance with the invention, a method to create billing records in a rating engine comprises the steps of: assembling one or more sets of subscriber information; assembling a rating plan; associating a rating procedure with a rating engine; and calculating billing records with the rating engine through the rating procedure using the rating plan and the subscriber information. In accordance with another aspect of the invention, an apparatus is described to carry out the above process.

The method and apparatus are applicable to any service where a subscriber is billed by the usage of a service or where the subscriber is billed a periodic basis for the service.

BRIEF DESCRIPTION OF THE DRAWINGS

FIG. 2 is a block diagram of the major electronic components of an information processing device according to the present invention.

FIG. 3 is a block diagram illustrating the software hierarchy for the information processing device of FIG. 2 according to the present invention.

FIG. 4 is a block diagram of the Rating Process according to the present invention.

DETAILED DESCRIPTION OF AN EMBODIMENT

Figure 1:
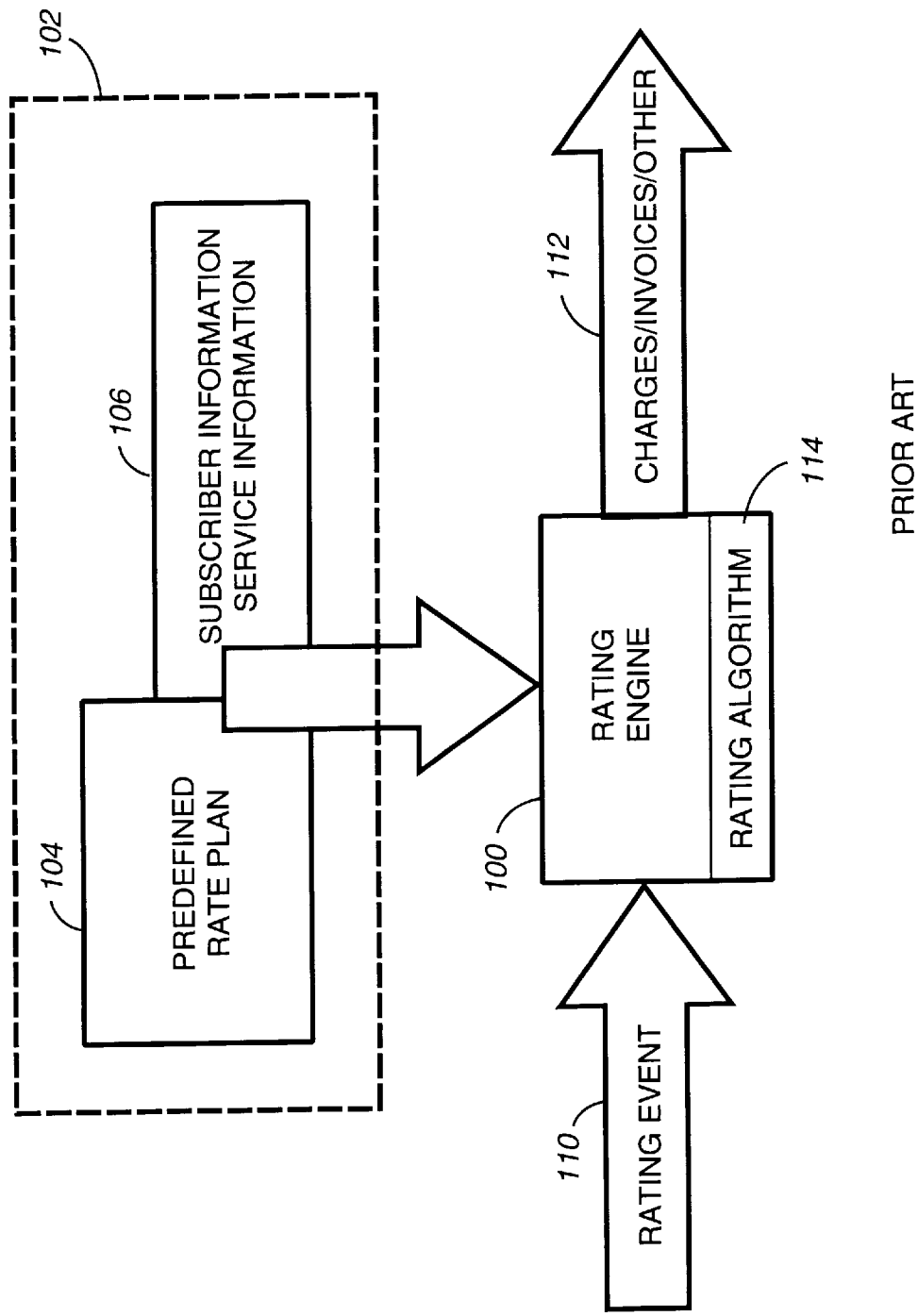
FIG. 1 is a block diagram of a prior art Rating Engine running a Rating Process using a Rating Algorithm and Subscriber Data for creating Billing Records.

Glossary of Terms Used in This Disclosure

Billing Record—a record of charges produced by a Rating Engine to a Subscriber for a Service. Billing Records include invoices, bills and other charges billed to a Subscriber.

Billing System—a system used to calculate charges and request payment from a subscriber or a subscriber's account such as a credit card. Modern Billing Systems also perform may other diversified activities such as service provisioning, credit checks, contract tracking and more. They also hold a wide variety of data such as detailed Subscriber Information, Service Information for each Subscriber, account comments and subscriber demographic information. Delivery—a process of moving a piece of data, formatted by a Rating Engine, to an external system. Delivery may be performed for many reasons, including EDI (Electronic Data Interchange) invoice transmission, credit card settlement, and can be customized to interface with automated systems or manual processes.

Feature—an attribute assigned to a Subscriber that modifies a subscriber's Service in some way. For example, Features could provide extended capabilities, or they could represent special treatment such as a bonus.

Period—a generic term for a time measurement such as a second, minute, hour, day, month, quarter or year.

Rating—a process by which charges are assigned to a Subscriber based on the particular usage of a Service.

Rating Algorithm—the arithmetic procedure applied to Rating Control Data to perform a sequence of one or more computational steps during the process of Rating.

Rating Control Data—Data provided to a Rating Engine for controlling the execution of the Rating Procedure. The Control Data may include one or more of the following: Rating Plan, RCD Groups, RCD Elements, Service Data, Subscriber Data, and Usage Data depending on the specific needs of the Service Provider.

Rating Control Data (RCD) Element—the basic building blocks for data. The data RCD Element can represent numbers and also text characters. An RCD Element contains Control Data for controlling the execution of the Rating Procedure.

Rating Control Data (RCD) Group—a set of zero or more RCD elements associated together for a defined package of services. As an example an RCD Group could be defined for services based on usage of a Subscriber Service (e.g., telephone) and another RCD Group defined for a flat fee for a select time Period (e.g., basic monthly cable service). It is possible to create numerous RCD Groups that have more than one instance of a RCD Element.

Rating Engine—a software routine for receiving Rating Control Data in order to create charge amounts to be billed to the Subscriber for services provided.

Rating Event—a Billing System event that is scheduled at regular Periods or on demand from a Billing System user.

Rating Plan—a set of zero or more RCD Groups associated together by a Service Provider for a defined package of services. It is possible to create numerous Rate Plans that have more than one instance of a RCD Group.

Rating Process—the process by which charges are assigned to a Subscriber based on the particular usage of a Service.

Rating Procedure—the physical realization of the Rating Algorithm in computer code. The interface between the core Rating Engine and the Rating Procedure is well defined and includes a standard entry point and all the information that should be needed. The Rating Procedure is loaded by the Rating Engine and is operating system dependent. In the event that the Rating Procedure does not have all the information that the Rating Procedure needs, then it can access the database or other data source. A database connection is provided to the Rating Procedure to improve performance.

Service—any item including a good, service, money or the movement thereof, that a Subscriber may use. One class of Service is communication services, such as POTs (Plain Old Telephone Service) line, cable line, cellular line, satellite, T1 or TCP/IP connection or equivalent. Another class of Service is utilities such as gas, oil, electric, water, sewer purchased by a Subscriber. Still, another class of Service is transportation such as ticketing, tolls, freight charges, and shipping charges.

Service Data—the Rate Plan, the period or term or the Service, the type of Service such as cable TV, telephone or transportation tolls collection.

Service Information—another name for Service Data

Service Provider—the entity or organization providing a Service.

Subscriber—an individual or company that is uniquely identified within the Billing System as a user of services. This could be a cellular phone subscriber, a user of Internet Services or other service user.

Subscriber Data—one or more pieces of personal information for a Subscriber such as the name, address, telephone number, E-mail address, county, taxing jurisdiction, terms and conditions of the subscriber and other information directed to the Subscriber.

Subscriber Information—another name for Subscriber Data.

Template—a set pattern of Rating Control Data that includes a Rating Plan and may include one or more RCD Groups and one or more RCD Elements. The Template represents the basic structure of the information within the sets of Rating Control, but does not include the actual data value for each RCD Element.

Usage Data—specific Service information such as when the service was rendered, the provider of the Service, where the Service was rendered.

Description

Referring to FIG. 2, there is shown a block diagram of the major electronic components of an information processing device 200 in accordance with the invention. The electronic components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The general operation of a computer comprising these elements is well understood. Network interface 216 provides connection to a computer network such as Ethernet, TCP/IP or other popular protocol network interfaces. Optional components for interfacing to external peripherals include: a Small Computer Systems Interface (SCSI) port 224 for attaching peripherals; a PCMCIA slot 222; and serial port 220. An optional diskette drive 226 is shown for loading or saving code to removable diskettes 228. The system 200 may be implemented by combination of hardware and software. Moreover, the functionality required for using the invention may be embodied in computerreadable media (such as 3.5 inch diskette 228) to be used in programming an information-processing apparatus (e.g., a personal computer) to perform in accordance with the invention.

FIG. 3 is a block diagram illustrating the software hierarchy for the information processing device 200 of FIG. 2 according to the present invention. The BIOS (Basic Input Output System) 302 is a set of low level of computer hardware instructions for communications between an operating system 306, device driver 304 and hardware 200. Device drivers 304 are hardware specific code used to communicate between and operating system 306 and hardware peripherals such as a CD ROM drive or printer. Applications 308 are software application programs written in C/C++, assembler or other programming languages. Operating system 306 is the master program that loads after BIOS 302 initializes, that controls and runs the hardware 200. Examples of operating systems include Windows 3.1/95/98/NT, Unix, Macintosh, OS/2, Sun Solaris and equivalents. One application running on the operating system 304 is a relational database product such as the Oracle Database server, IBM DB/2, Microsoft SQL Server or equivalent.

The information processing device 200 can be configured as a server coupled to one or more clients through a network. (not shown). The network can be a private Intranet, Internet or other computer network. In the preferred embodiment, the protocol is HTTP (Hyper Text Transfer Protocol) and the exact hardware/software protocol is not important to this present invention and should not be limited. The clients are capable of running Microsoft Windows 3.1/95/98/NT or equivalent operating systems.

Figure 5:
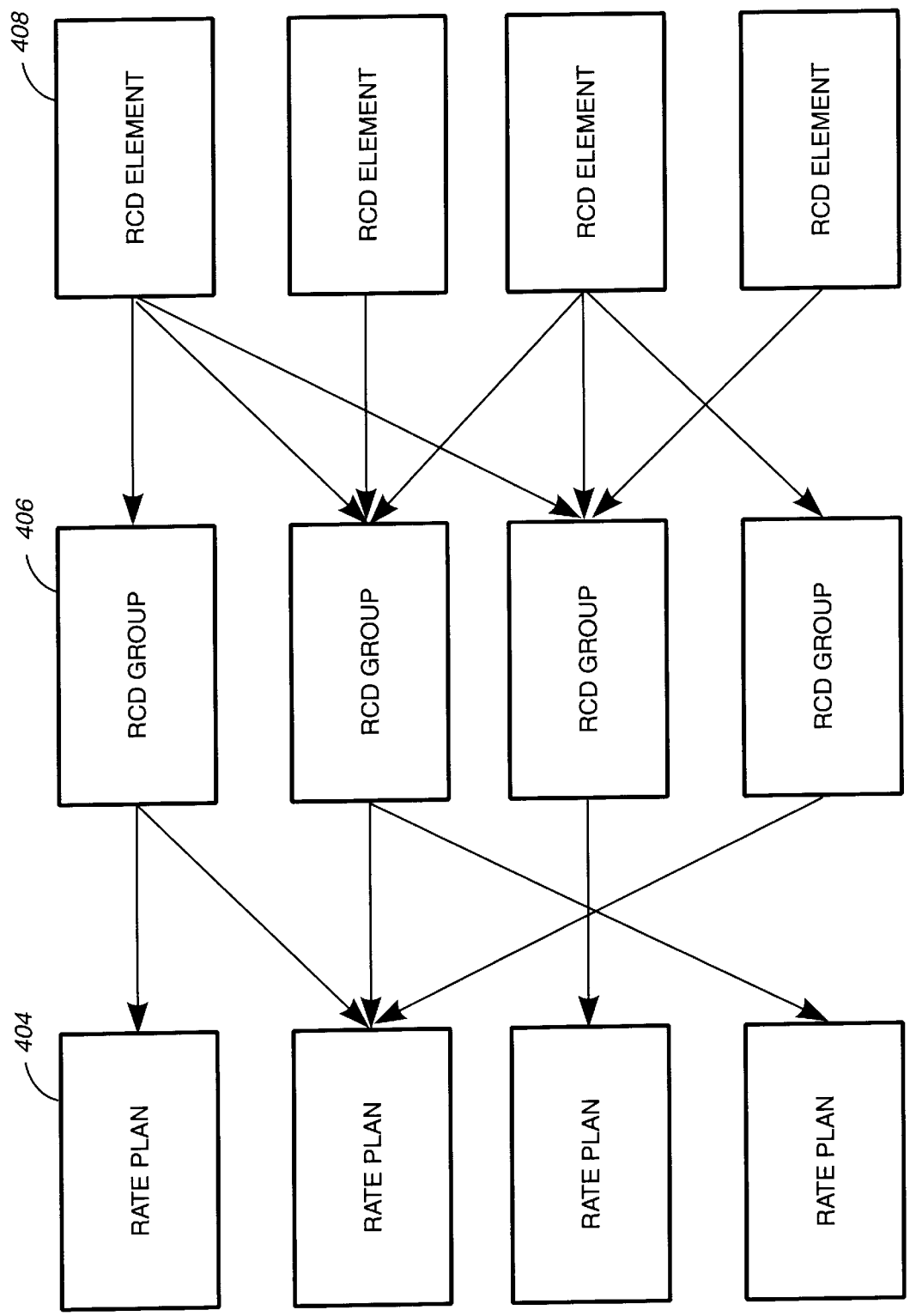
FIG. 5 is a block diagram of the hierarchical data relationships of a RCD Element, a RCD Group and a Rate Plan according to the present invention.

FIG. 4 is a block diagram of the Rating Process according to the present invention. The Rating Process is an application 308 (as shown in FIG. 3) designed to work on operating system 306 (as shown in FIG. 3) and another application 308 such as a relational database. The application 308 (as shown in FIG. 3) can be written in C/C++ or any other programming language supported by operating system 306. A Rating Engine 100 produces subscriber charges, invoices, bills and other Billing Records 112 in response to a Rating Event. A Rating Procedure 410 has a well-defined interface such as shared objects in UNIX or DLLs in Windows NT. Data 102 contains Subscriber Data 106 and also Rate Plan 404. The hierarchial relationship between Rate Plan 404, RCD Group 406 and RCD Element 408 is illustrated in FIG. 5. RCD Group 408 is related to an RCD Element 408 through a one to many relationship. Stated differently, each RCD Group 406 has one or more RCD Elements 408. Likewise, each Rate Plan 404 is related to an RCD Group 406 through a one to many relationship. It is important to point out that distinct RCD Elements 408 and distinct RCD Groups 406 can have more than one association in this hierarchial relationship so that a particular RCD Element 408 can appear in two or more RCD Groups 406 which can appear in two or more Rate Plans 404.

Figure 6A:
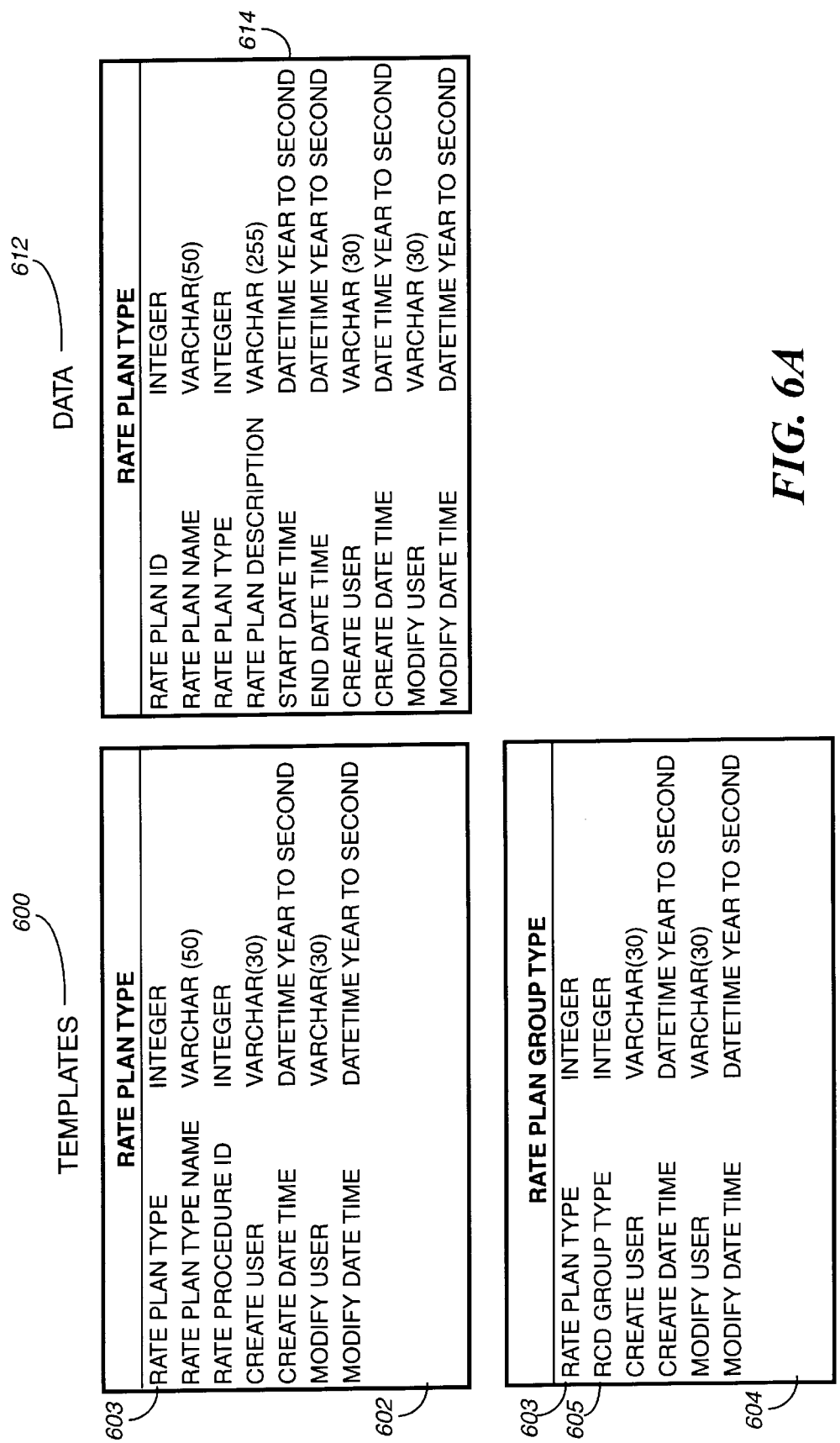
FIG. 6 is a block diagram of the hierarchical interrelationship between template structures and data structures according to the present invention.

The programming structures supporting this hierarchial relationship are constructed using combination of relational database functions and object oriented programming code. The hierarchial data relationship illustrated in FIG. 5 will now be expanded to detail the interrelationship between the templates used to associate RCD Elements to RCD Groups to Rate Plans and the data associated with these structures. Turning to FIG. 6, there is shown the programming structures detailing the interrelationship template structures and data structures according to the present invention. FIG. 6 is divided into two columns, a Template Column 600 and a Data Column 612. Once the associations between the templates or in object programming parlance the abstractions are affiliated to one another using the interface as described in FIG. 8, the related data can be entered as described in FIG. 9.

The Template Column 600 has three entries, template structure Rate Plan Type 602, template structure RCD Group Type 606 and template structure RCD Element Type 610. Each of these three template structures corresponds directly to an entry across from it in the Data Column 612. Specifically, template structure Rate Plan Type 602 corresponds to the data structure Rate Plan 614, template structure RCD Group Type 606 corresponds to data structure RCD Group 616 and template structure RCD Element Type 610 corresponds to the data structure RCD Element 618. The data structures in Data Column 612 conform with the hierarchial data relationship in FIG. 5 that illustrates the grouping of many RCD Elements to a RCD Group 406 and the grouping of many RCD Groups 406 to a Rate Plan 408.

To achieve this many to one grouping, the templates structure use intermediary mapping structures, Rate Plan Group Type 604 and Rating Control Element Type 608. The detail of these two mapping intermediary template structures will now be explained. In order to map RCD Group Type 606 to a Rate Plan 602, the Rate Plan Group Type 604 includes two members, Rate Plan Type 603 and RCD Group Type 605. The Rate Plan Type 603 has a corresponding member entry Rate Plan Type 603 in structure Rate Plan Type. The RCD Group Type 605 has a corresponding member RCD Group Type 605 in structure RCD Group Type 606. During the association of the RCD Group Type 606 to a Rate Plan Type as described using a RCD Configuration Tool in FIG. 8, these two member Rate Plan Type 603 and RCD Group Plan Type 605 are filled. The Rate Plan Group Type 604 is now associated to a Rate Plan Type 602.

The grouping of many RCD Element Types 610 to a RCD Group Type 606 is achieved using an analogous intermediary method. Similarly, as described above for the Rate Plan Group Type 604 intermediary mapping structure above, the mapping structure Rating Control Element Type 608 has two members. The first member is RCD Group 605. The structure RCD Group Type 606 has a corresponding member RCD Group type 605. The second member in mapping structure Rating Control Element Type 608 is RCD Element Type 607. The member RCD Element Type 607 is also a member of structure RCD Element Type 610. During the association of the RCD Element Type 610 to a RCD Group Type 606 as described using a RCD Configuration Tool in FIG. 8, these two members, RCD Group Type 605 and RCD Element Type 607 are filled. The RCD Element Type 610 is now associated to a RCD Group Type 606.

Now the association between Templates 600 and Data 612 is described. The association is carried out by using a common member in both the template structure and the corresponding data structure. Specifically, the template structure Rate Plan Type 602 has a member Rate Plan Type 603 which is associated with the member Rate Plan Type 603 of data structure Rate Plan 612. The template structure RCD Group type 606 has a member RCD Group Type 605 which is associated with the member RCD Group ID 605 of the data structure RCD Group 616. Template structure RCD Element Type 610 has a member RCD Element Type 607 which is associated with member RCD Element Type 607 of data structure RCD Element 618.

It should be understood to those skilled in the art, that the template structures in Template Column 600 and the data structure in Data Column 612 could be combined into one larger structure instead of two separate parallel structures. This combinations of two structures into one structure may be more efficient in certain system implementations.

Figure 7:
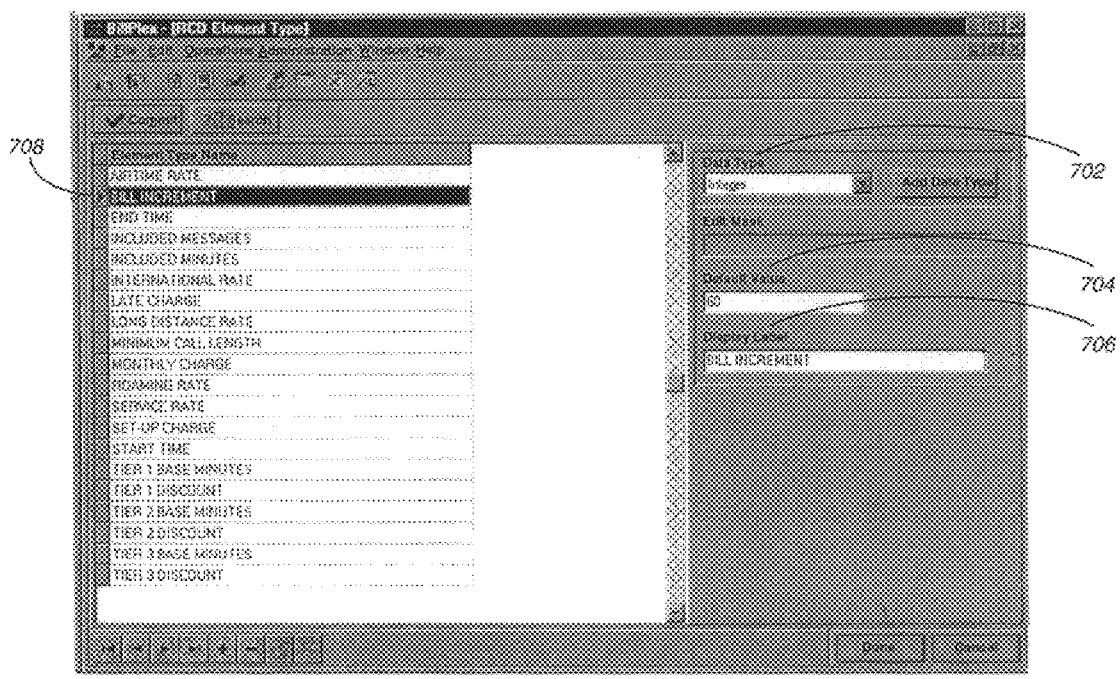
FIG. 7 is a screen capture of an example graphical user interface for creating template structure RCD Element Types with associated Data Types, Default Values and Display Labels according to the present invention.

Referring now to FIG. 7 is a screen capture of an example graphical user interface for creating the template structure RCD Element Type 610 with the assigned Data Type 702, default Data Value 704 and the Display Label 706. In this example the Data Type 702 is an integer, the Default Value 706 is 50 and the Display Label 706 is BILL INCREMENT. The Display Label corresponds to Element Type Name 708, however this exact matching is not required. After the RCD Element Types are created, they are associated to RCD Groups using the RCD configuration Tool of FIG. 8.

Figure 8:
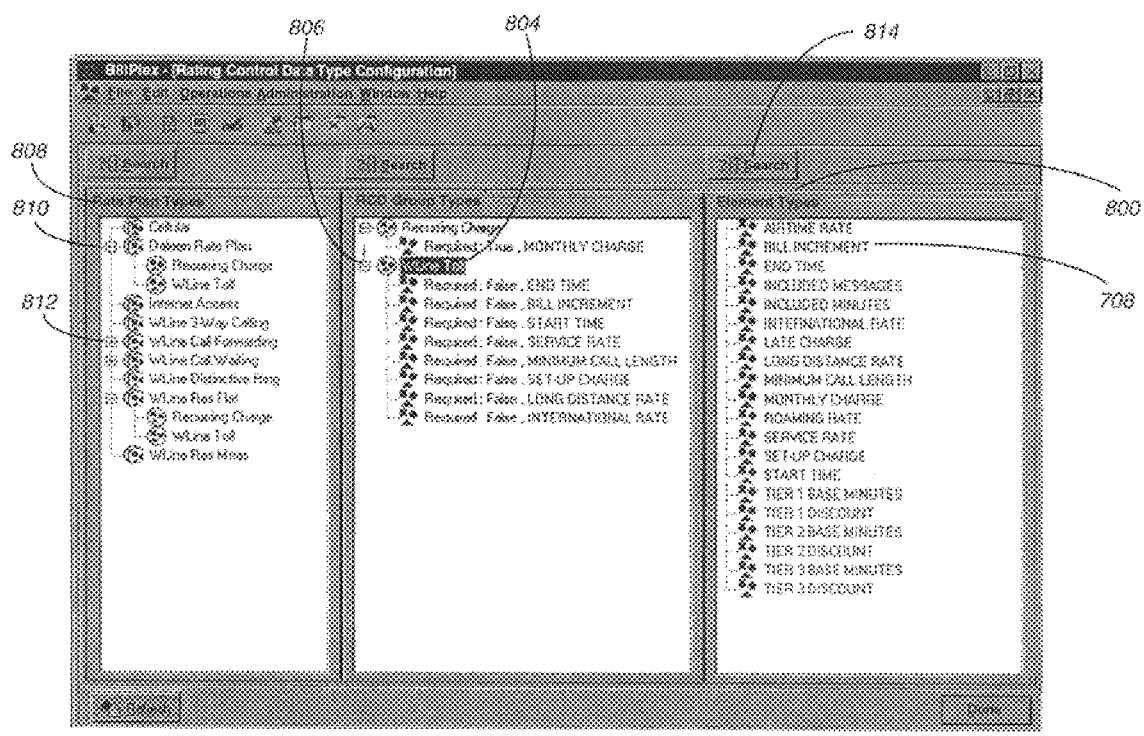
FIG. 8 is a screen capture of an example RCD configuration graphical user interface for associating template structures of RCD Element Types, with RCD Group Types and Rate Plan Types according to the present invention.
Figure 9:
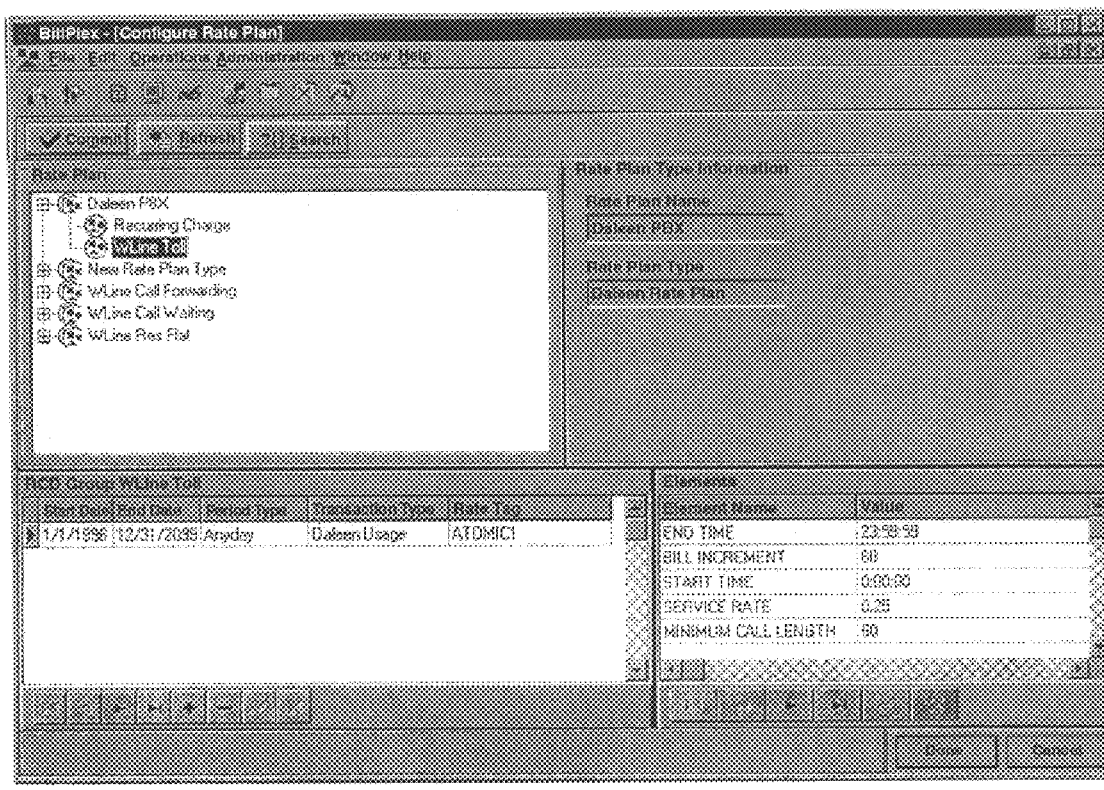
FIG. 9 is a screen capture of a Rate Plan graphical user interface for a user to enter data for the RCD elements that have been built and associated as part of the Rate Plan according to the present invention.

FIG. 8 is a screen capture of an example RCD configuration graphical user interface for associating template structure RCD Element Types 610, with RCD Group Type 606 and associating template structure RCD Group Types 606 to Rate Plan Type 602. This graphical user interface enables the dragging and dropping of Element Types 700 into RCD Group Types 704 and RCD Group Types 704 into Rate Plan Types 708. The three columns of types, Element Types 700, RCD Group Types 794 and Rate Plan Type 708 correspond three template structures of RCD Element Type 610, RCD Group Type 606 and Rate Plan Type 602. Notice under the Element Types 700, the Element Type Name 608 as described in FIG. 6. The Element Type Name 708 is associated under the RCD Group Type 702 of WLineToll Group 704. The minus sign 706 in the box next to WLineToll Group 704 allows the elements associated with the WLineToll Group 704 to be expanded to show all the elements. In contrast, the minus sign can be change to a plus sign 712 to indicate that more detail is available. In this example, the WLineToll Group 704 is associated with Rate Plan Type 708 called Daleen Rate Plan 710. Search buttons 714 allow for the user to quickly locate an Element Type 700, or RCD Group Type 702 or Rate Plan Type 704 by name.

FIG. 8 is a screen capture of a Rate Plan graphical user interface for a user to enter data for the RCD Elements that have been built and associated as part of the Rate Plan according to the present invention. The data entered for each RCD Element 618 is associated to data in the RCD Group 616 and data in the Rate Plan 612 as described in the template structures in FIG. 6. The table below illustrates a simple data entered for Rate Plan 614 with RCD Groups 616 and RCD Elements 618. On the left column of the table are two types of a Usage Plan Group and a Periodic Plan Group with corresponding elements. These are grouped under two Plan types, a Basic Plan and a Platinum Plan. Data for each Element under each Usage and Periodic Group and Basic and Platinum Plan is shown.

| Cellular Rate Plan Type | Cellular Basic Plan | Cellular Platinum Plan |
|---|---|---|
| Usage RCD Group | | |
| • Charge per Minute | $0.25 | $0.21 |
| • Free Minutes | 0 | 60 |
| • Roaming Charge/Min. | $0.42 | $0.42 |

-continued

| Cellular Rate Plan Type | Cellular Basic Plan | Cellular Platinum Plan |
|---|---|---|
| Periodic RCD Group | | |
| • Monthly Charge | $20 | $35 |

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to create billing records in a rating engine comprising the steps of:

assembling one or more sets of subscriber information;

assembling a rating plan;

associating one or more fixed rating procedures with fixed executable rating engine;

calculating billing records with the rating engine through the rating procedure using the rating plan containing rating control data and the sets of subscriber information.

2. The method in claim 1 further comprising the step of:

assembling one or more sets of rating control data groups; and the step of assembling a rating plan includes the sub-step of assembling the sets of rating control data groups which have been assembled.

3. The method in claim 2 further comprising the step of:

assembling one or more sets of rating control data elements; and the step of assembling one or more sets of rating control data groups includes the sub-step of assembling the sets of rating control data elements which have been assembled.

4. The method in claim 1 wherein the step of assembling one or more sets of subscriber information includes the sub-step of:

assembling one or more sets of service information.

5. The method of claim 3 further including the step of:

providing a graphical user interface for associating the rating control data groups into the rating plans.

6. The method of claim 3 further including the step of:

providing a graphical user interface for associating the rating control data elements into the rating control data groups.

7. The method of claim 3 further including the step of:

providing a graphical user interface for entering data into the rating control data elements.

8. A computer readable medium containing program instructions for creating billing records in a rating engine, the program instructions comprising instructions for:

assembling one or more sets of subscriber information;

assembling a rating plan;

associating one or more fixed rating procedures with fixed executable rating engine;

calculating billing records with the rating engine through the rating procedure using the rating plan containing rating control data and the sets of subscriber information.

9. The computer readable storage medium in claim 8 further comprising the instruction for:

assembling one or more sets of rating control data groups; and the instruction for assembling a rating plan includes the sub-step of assembling the sets of rating control data groups which have been assembled.

10. The computer readable storage medium in claim 9 further comprising the instruction for:

assembling one or more sets of rating control data elements; and the instruction for assembling one or more sets of rating control data groups includes the sub-step of assembling the sets of rating control data elements which have been assembled.

11. The computer readable storage medium in claim 8 wherein the instruction for assembling one or more sets of subscriber information includes the instruction for:

assembling one or more sets of service information.

12. The computer readable storage medium in claim 11 further comprising the instruction for:

providing a graphical user interface for associating the rating control data groups into the rating plans.

13. The computer readable storage medium in claim 11 further comprising the instruction for:

providing a graphical user interface for associating the rating control data elements into the rating control data groups.

14. The computer readable storage medium in claim 11 further comprising the instruction for:

providing a graphical user interface for entering data into the rating control data elements.

15. Apparatus to create billing records in a rating engine comprising:

one or more sets of subscriber information;

a rating plan;

means for associating one or more fixed rating procedures with fixed executable rating engine;

means for calculating billing records with the rating engine through the rating procedure using the rating plan containing rating control data and the sets of subscriber information.

16. The apparatus in claim 15 further comprising:

one or more sets of rating control data groups; and the rating plan includes a means for associating sets of rating control data groups.

17. The apparatus of claim 16 further comprising:

one or more sets of rating control data elements; and the means for assembling one or more sets of rating control data groups includes the means for assembling the sets of rating control data elements.

18. The apparatus of claim 16 wherein the sets of subscriber information includes one or more sets of service information.

19. The apparatus of claim 18 further comprising:

a graphical user interface for associating the rating control data groups into the rating plans.

20. The apparatus of claim 18 further comprising:

a graphical user interface for associating the rating control data elements into the rating control data groups.

21. The apparatus of claim 18 further comprising:

a graphical user interface for entering data into the rating control data elements.

* * * * *